Dec. 6, 1966
G. J. CROWDES
3,290,593
METER RELAY USING FIBER OPTICS FOR EASE
OF REPLACING A LAMP AND PHOTOCELL
Filed Jan. 29, 1963
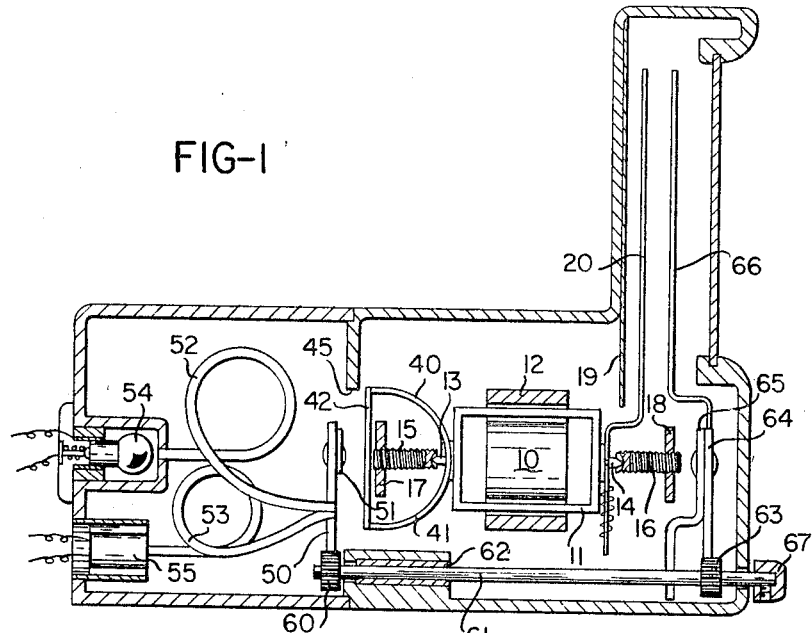
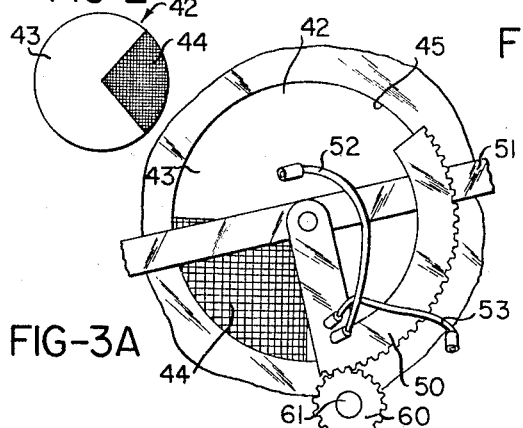
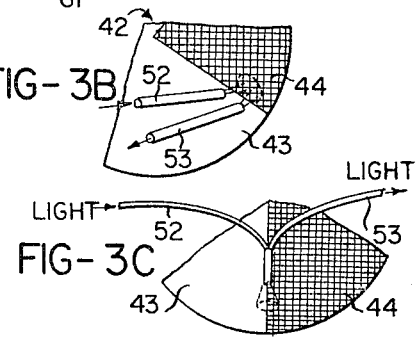
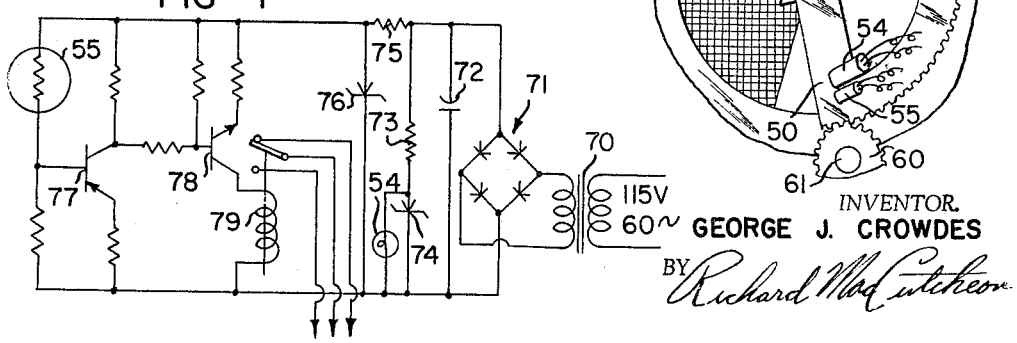
INVENTOR.
GEORGE J. CROWDES
BY Richard MacCutcheon
ATTORNEY United States Patent Office 3,290,593
Patented Dec. 6, 1966

3,290,593
METER RELAY USING FIBER OPTICS FOR EASE OF REPLACING A LAMP AND PHOTOCELL
George J. Crowdes, Chesterland, Ohio, assignor, by mesne assignments, to API Instruments Company, Chesterland, Ohio, a corporation of Ohio
Filed Jan. 29, 1963, Ser. No. 254,779
1 Claim. (Cl. 324—96)

Numerous methods have been devised for utilization of a sensitive D'Arsonval or other meter movement to perform electrical control action. The most useful and successful methods have been (1) the closing of electrical contacts, particularly with the use of means to firmly press together the adjustable contact and the signal responsive contact, (2) the use of capacitive vane or inductive coupling means to alter the state of radio frequency oscillator circuits, and (3) the use of vanes, signal pointers, and so on, to operate photoelectric cell position sensing means.

Although electrical contact closing arrangements can be made very long lived (for example, 10,000,000 electrically loaded cycles) and reliable, the working life of the basic signal responsive portion of the apparatus is essentially unlimited, so that it would be desirable to have the controlling portion equally non-wearing. Further, only by cycle frequency increasing (and thus, ultimate life decreasing) techniques can contact meter relays be made to produce proportional, rather than purely on-off, effects.

Capacitive vane and optical sensing meter relays have no inherent mechanical life limitations. However, in the past, both have suffered from limitations of a different type, by comparison with contact making meter relays: Capacitive vanes and variable inductive coupling means, because of the mass carrying limitations of sensitive meter movements, can produce only a relatively small capacitance or mutual inductance change when the signal responsive movement passes the point at which the control action is to take place (the "set point"), and thus a circuit must be used which can sense such small changes; inherently such circuits are hypersensitive to small partly uncontrollable mechanical shifts which cause unpredictable and thus undesirable real set point changes, although the adjustable pointer at the meter face does not move accordingly to reveal to the user the inaccuracy of his instrument. Optical sensing arrangements have suffered from the same defect.

The basic and evident means of overcoming this limitation is the use of long radii for the actuating vane, which proportionally increases the change in light or capacitance per angular degree of signal responsive movement. However, this method of overcoming the limitation requires both relatively large size instruments and relatively great mass added to the sensitive meter movement, and each is a disadvantage under many practical conditions.

Another limitation and disadvantage of many prior art, non-contact meter relays is that when the signal responsive pointer passes a little beyond the set point, control is in fact lost, except that locked-in electrical circuitry "remembers" the passing; this memory may be confused by a momentary power stoppage, and thereafter on power resumption the control system may operate in a dangerously incorrect manner.

It is therefore an object of the present invention to overcome these disadvantages.

Other objects and advantages of my invention will be evident on careful consideration of the following description taken in connection with the accompanying drawings, in which:

FIG. 1 is a cross section through "jewel center" of a meter relay incorporating a preferred embodiment of the invention;

FIG. 2 shows the flat surface of a disc 42, as seen from the rear of the meter movement of FIG. 1, FIG. 3A is a perspective view of certain elements of FIG. 1, for explanatory purposes, FIGS. 3B, 3C and 3D show three embodiments of the main elements in FIG. 3A, and FIG. 4 shows a selected electronic control circuit, operable with the invention, to complete the teaching of its practice.

Referring to FIG. 1, a conventional, internal (core) magnet, sensitive meter movement is shown. The magnet 10 cooperates with a surrounding coil 11, rotatable between magnet 10 and a generally cylindrical return path 12, on pivots 13 and 14 about or within jewel bearings 15 and 16. For simplicity, bearing supports 17 and 18 are merely signified rather than drawn in detail. Other conventionally associated parts of the meter movement are a dial 19 in front of which a signal responsive pointer 20 is positioned radially by movements of coil 11. Not shown (to improve the clarity of what is shown) are helical springs, which hold the signal responsive pointer in a chosen location in the absence of incoming signal and provide return torque in proportion to pointer deviation from that location, and which also conduct electrical signals to and from coil 11, these signals being ones to which it is my invention's purpose to be responsive.

Elements in FIG. 1 according to the invention include bracket means 40 and 41 mounted to rotate with moving coil 11 as it responds (by movement) to incoming electrical signals. A disc 42 is mounted on brackets 40–41 in a position generally perpendicular to an axis containing the centers of jewels 15 and 16 with the disc's center of gravity preferably positioned approximately thereon. A viewing window 45 permits optical access to disc 42. The window may be glazed, if desired, but I prefer to have it merely an opening, providing dust sealing by means of an exterior case. Disc 42, as detailed in FIG. 2, has areas 43 and 44 which differ in their light reflecting ability: In the particular embodiment selected for illustration, relatively highly absorptive sector 44 occupies approximately 95° angular degrees (corresponding to full scale movement range of coil 11 and pointer 20), while the relatively highly reflective sector 43 occupies the remainder of the disc surface.

A bracket 50, rotatable substantially about jewel center axis, is in the FIG. 1 embodiment, supported by a stationary bracket 51, and carries a radiation source, in this case a flexible fiber optic bundle 52. 50 also carries a reflected light sensing means, in this case a flexible fiber optic bundle 53. The bracket 50, it will be noted, rotates in a plane substantially parallel to the plane of disc 42 although spaced slightly from it so as not to touch it. The remote ends of fiber bundles 52 and 53 terminate, respectively, at a lamp 54 and a photoelectric cell 55. Connection leads are shown to supply power to lamp 54 and convey signals from photoelectric cell 55.

For most practical purposes it is desirable that the position of rotatable bracket 50 be adjustable from the front of the meter, and that a "set point" pointer, readable from the front, with respect both to the meter dial and to the signal responsive pointer, be provided. In FIG. 1 one possible arrangement for doing this is illustrated. Thus a gear 60, firmly affixed to a shaft 61, engages teeth cut into bracket 50, as hereinafter explained, particularly by reference to FIGS. 3A and 3D. Shaft 61 is rotatable within a guiding channel and bearing 62, which may be a hole in the plastic meter case, and carries another gear 63 firmly affixed. Gear 63 engages teeth in a rotatable front bracket 64, which, like the rear rotatable bracket 50, is arranged to rotate substantially around the jewel center axis, being supported by a front stationary bracket 65, an extension of which forms a front bearing for shaft 61, and whose means of support, for clarity, is not shown. A set pointer 66 is attached to rotatable front bracket 64, to indicate with respect to dial 19 and signal pointer 20 the position of rear rotatable bracket 50. The obvious and conventional enclosure arrangements are not detailed here. A knob, 67 or other means, accessible from the front of the meter relay is provided for adjusting the position of shaft 61, and therefore of rotatable brackets 50 and 64.

In operation, as electrical signal to coil 11 increases, disc 42, its support brackets 40 and 41, the coil 11, and signal responsive pointer 20 all move as one mechanical unit with respect to dial 19. By adjustment of shaft 61, set pointer 66 has been previously positioned to a desired location with respect to dial 19, and this adjustment has also positioned rear rotatable bracket 50 and the radiation source and light sensing means mounted on it. When signal pointer 20 approaches set pointer 66 (at its preselected position with respect to dial 19) a boundary between reflective portion 43 and absorptive sector 44 of disc 42 approaches the region "viewed" by the radiation source and radiation sensing means on bracket 50. When the signal thereafter causes the pointers to pass one another, the radiation viewing means and the sector boundary pass one another, and an electrical change is signaled via the sensing means electrical connections.

Consideration of the effects of certain manufacturing and operating tolerances clarifies some of the operational, manufacturing and economic advantages of the general arrangement disclosed. For instance, the disc 42 may be slightly tilted with respect to a plane perpendicular to jewel center axis, and the disc center may not accurately coincide with jewel center axis, and the disc may be less than perfectly flat, but despite these necessary tolerances the relationship of the actual position at which electrical signaling will occur remains very close to that expected from the adjusted relationship of set pointer to dial; this may be described as "low tracking error" in spite of relatively large manufacturing tolerances.

The above described insensitivity to manufacturing tolerances leads, of course, to relatively reduced difficulty in making manufacturing adjustments, and also leads to a long, stable operating life for the instrument in the user's hands, even when vibration, shock, relief of internal strains in parts and so on occur with normal usage and age accumulation. By comparison, prior art means of non-contact meter relay actuation do not inherently have such stability, low tracking error, and so on, particularly where practiced in enclosures hardly larger than the meter movement and dial alone.

Because of the arrangement of disc and radiation elements according to the present invention, no means are required to "remember" that the signal has passed the set point, for the reflected radiation decrease (or increase, if that mode of operation be utilized) which occurred with the set point passing remains in effect even if the signal increases to, or even if it exceeds, full scale deflection. If the power fails, when it returns the control output will resume the same output signaling condition it had before the power failed, unless, in the interim, the signal level has decreased to below the set point, in which case with power resumption the correct meter relay output will still be furnished.

FIG. 3A shows the rear rotatable bracket 50 mounted for rotation with respect to stationary bracket 51 and having gear teeth engaged by positioning gear 60 as driven by shaft 61. FIG. 3A also shows reflective area 43 of disc 42 and absorptive area 44 of disc 42 together with radiation source 52 and radiation sensing means 53, this drawing clarifying FIG. 1 with regard to details. Assuming upscale (clockwise from the front) signal pointer movement as a result of increasing signal, in FIG. 3A the disc 42 and parts 52 and 53 are shown in a position where a small increase in signal will cause an abrupt change in radiation reception by sensing means 53 as the section of disc 42 viewed by it changes from reflective to relatively absorptive. Means such as that hereinafter discussed (FIG. 4) will, when this occurs, cause a relay closure, or other control action to occur.

FIG. 3B shows a detail of FIG. 3A, like parts being like numbered, to emphasize how, by slightly tilting fiber optic bundle ends 52 and 53 toward each other, the latter can observe reflection from the area illuminated by the former.

FIG. 3C shows a slightly different embodiment, wherein the two fiber optic bundles are combined in a unitary termination, which simplifies construction and manufacturing adjustments to some extent.

FIG. 3D shows an embodiment in which fiber optic bundles are not used, which results in certain cost savings but certain relative increases in inconvenience such as occur when replacing the lamp 54 or other radiation source, or the radiation sensing cell 55.

FIG. 4 shows an example of an appropriate circuit for amplifying the control signals produced by radiation responsive device 55 and operating a control relay, a most common requirement for meter relays. A transformer 70 provides line isolation and drops the voltage to a level suited for use with the selected circuit components. A full wave bridge rectifier 71 rectifies the current, and this is smoothed by a capacitor 72. A current limiting resistor 73 and zener diode 74 provide a regulated voltage supply for lamp 54, used as radiation source as described above. Another load resistor 75 and zener diode 76 provide a regulated voltage source for the amplifier proper. The amplifier, being a quite conventional two stage direct coupled D.C. amplifier, operates in a well known manner. The presence of relatively decreased radiation at photoelectric cell 55, the decrease occurring because the signal exceeds the set point, as explained above, reduces the forward bias of transistor 77, whose collector current correspondingly decreases and in turn decreases the forward bias of transistor 78. The amplified collector current decrease of transistor 78 is sufficient to release relay 79, altering the position of its contacts and thus providing relatively high current control action.

While I have illustrated and described particular embodiments, numerous modifications (e.g., for providing proportional rather than on-off output signals, or for providing multiple set points) may obviously be made without exceeding the true spirit and scope of the invention which I intend to have defined only by the appended claim taken with all reasonable equivalents.

Consideration of the optical and mechanical relationships described above should make it evident that as signal responsive movement of the coil-disc structure causes the boundary between relatively more and less reflective areas of the disc to pass through the "viewed" region, the signal produced by the photocell will change smoothly between values representative of the viewing entirely of the more and less reflective disc areas. This smoothly changing signal can be utilized by amplification means well known to those skilled in the art to produce proportional control of powerful apparatus. It is evident that when this is done, no life limiting relatively high frequency makings and breakings of contacts are employed.

I claim:

In a meter relay of the type having a signal responsive electromagnetic meter movement which includes a rotatable coil which takes an angular position, about an axis, corresponding to an input signal, and having a surface connected to said coil to be rotatable in a plane at right angles to said axis, said surface having a reflective portion and a non-reflective portion, the combination of a relatively stationary hence readily replaceable lamp, a flexible fiber optic bundle having a first end which is stationary and which receives illumination from said lamp and having a second end which is movable and arranged to illuminate a limited portion of said surface in one position thereof, a relatively stationary photocell, a flexible fiber optic bundle having a first end which is movable and arranged to view said limited portion of said surface when in said position and having a second end which is fixed and arranged to illuminate said photocell, and meter relay set point adjusting means including rod and gear means for moving the second end of the first mentioned bundle and the first end of the second mentioned bundle relative to said surface.

References Cited by the Examiner

UNITED STATES PATENTS

| | | | |
|---|---|---|---|
| 2,410,104 | 10/1946 | Rainey | 250—227 |
| 3,118,087 | 1/1964 | Eisenberg | 340—266 X |

WALTER L. CARLSON, *Primary Examiner.*

RUDOLPH V. ROLINEC, *Examiner.*